(12) United States Patent
Harmon et al.

(10) Patent No.: US 12,005,862 B2
(45) Date of Patent: Jun. 11, 2024

(54) FRONT TRUNK INCLUDING MOVEABLE PLATFORM

(71) Applicant: Ford Global Technologies, LLC, Dearborn, MI (US)

(72) Inventors: Michael John Harmon, Northville, MI (US); Erol Ozcelik, Old Bridge, NJ (US); Jesse Rene Diephuis, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 17/892,386

(22) Filed: Aug. 22, 2022

(65) Prior Publication Data

US 2023/0391271 A1    Dec. 7, 2023

Related U.S. Application Data

(60) Provisional application No. 63/347,704, filed on Jun. 1, 2022.

(51) Int. Cl.
*B60R 5/02*  (2006.01)
*B60R 5/00*  (2006.01)

(52) U.S. Cl.
CPC .............. *B60R 5/02* (2013.01); *B60R 5/003* (2013.01)

(58) Field of Classification Search
CPC .. B60R 5/02; B60R 5/04; B60R 5/041; B60R 9/06; B62D 25/087; B62D 25/10; B62D 25/105
USPC .......................... 296/24.44, 24.45, 37.1, 37.6
See application file for complete search history.

(56) References Cited

U.S. PATENT DOCUMENTS

| | | | | |
|---|---|---|---|---|
| 2,329,882 | A * | 9/1943 | Clark | B60Q 1/28 |
| | | | | 362/808 |
| 2,784,027 | A | 3/1957 | Temp | |
| 4,305,695 | A * | 12/1981 | Zachrich | B60P 1/00 |
| | | | | 414/522 |
| 5,692,792 | A | 12/1997 | Klar | |
| 6,644,707 | B2 * | 11/2003 | McLaughlin | B60R 5/041 |
| | | | | 296/76 |
| 10,633,033 | B1 * | 4/2020 | Salter | B62D 25/12 |

(Continued)

FOREIGN PATENT DOCUMENTS

| | | | | |
|---|---|---|---|---|
| WO | 1988006076 A1 | 8/1988 | | |
| WO | WO-2019015509 A1 * | 1/2019 | | A45C 5/00 |

OTHER PUBLICATIONS

Levin, T. (2022, January 6). Tour the coolest features of the New Electric Chevy Silverado, from ultra-fast charging to a front trunk. Business Insider. Retrieved Aug. 17, 2022, from https://www.businessinsider.com/electric-chevy-silverado-ev-features-charging-midgate-frunk-multiflex-tailgate-2022-1#chevy-also-envisions-accessories-for-the-frunk-like-slide-out-drawers-and-tool-boxes-20.

(Continued)

*Primary Examiner* — Jason S Daniels
(74) *Attorney, Agent, or Firm* — Vichit Chea; Carlson, Gaskey & Olds, P.C.

(57) ABSTRACT

This relates to a front trunk including a moveable platform. In some aspects, the techniques described herein relate to a motor vehicle, including: a front trunk including a platform configured to move between a retracted position and a deployed position, wherein, when the platform is in the retracted position, a panel on a top of the platform provides a floor of the front trunk, and wherein, when the platform is in the deployed position, the panel provides a work surface.

10 Claims, 6 Drawing Sheets

(56) References Cited

U.S. PATENT DOCUMENTS

| | | | |
|---|---|---|---|
| 10,730,400 B2* | 8/2020 | Salter | B60L 53/18 |
| 11,230,226 B1 | 1/2022 | Aquilina et al. | |
| 11,292,532 B1* | 4/2022 | Heinzelman | B60R 5/041 |
| 2005/0140159 A1* | 6/2005 | Barber | B60P 3/14 |
| | | | 296/37.6 |
| 2006/0097021 A1* | 5/2006 | Stanton | B60R 5/04 |
| | | | 224/404 |
| 2022/0355738 A1* | 11/2022 | Gill | B62D 25/087 |

OTHER PUBLICATIONS

Masker, M. (n.d.). Ford F150 Lightning EV truck's front trunk: What the frunk? DrivingLine. Retrieved Aug. 17, 2022, from https://www.drivingline.com/articles/ford-f150-lightning-ev-truck-what-the-frunk/.

* cited by examiner

FRONT TRUNK INCLUDING MOVEABLE PLATFORM

RELATED APPLICATION(S)

This application claims the benefit of U.S. Provisional Application No. 63/347,704, filed Jun. 1, 2022, the entirety of which is herein incorporated by reference.

TECHNICAL FIELD

This disclosure relates to a front trunk including a moveable platform.

BACKGROUND

Electrified vehicles are being developed to either reduce or completely eliminate the reliance on internal combustion engines. With the onset of electrified vehicles, many existing components in the vehicle engine compartment may become unnecessary. The space made available by the removal of these components makes room for a front trunk, which is a storage compartment located near the front of the vehicle, and which is commonly referred to using the portmanteau "frunk."

SUMMARY

In some aspects, the techniques described herein relate to a motor vehicle, including: a front trunk including a platform configured to move between a retracted position and a deployed position, wherein, when the platform is in the retracted position, a panel on a top of the platform provides a floor of the front trunk, and wherein, when the platform is in the deployed position, the panel provides a work surface.

In some aspects, the techniques described herein relate to a motor vehicle, wherein the platform is configured to slide in a direction parallel to a centerline of the motor vehicle when moving between the retracted and deployed positions.

In some aspects, the techniques described herein relate to a motor vehicle, wherein the panel is supported by a recess in a top of the platform.

In some aspects, the techniques described herein relate to a motor vehicle, wherein the panel is selectively removable from the recess, and wherein another panel exhibiting at least one dimension different than the panel is configured to fit in the recess.

In some aspects, the techniques described herein relate to a motor vehicle, wherein a front surface of the platform provides at least a portion of a front bumper of the motor vehicle.

In some aspects, the techniques described herein relate to a motor vehicle, wherein the platform includes a drawer configured to slide relative to the platform.

In some aspects, the techniques described herein relate to a motor vehicle, wherein the front surface of the platform provides a front surface of the drawer.

In some aspects, the techniques described herein relate to a motor vehicle, further including a plurality of storage compartments arranged adjacent a rear of the platform.

In some aspects, the techniques described herein relate to a motor vehicle, wherein the plurality of storage compartments are configured to slide together with the platform.

In some aspects, the techniques described herein relate to a motor vehicle, further including a powered assembly configured selectively cause the platform to move between the retracted and deployed positions.

In some aspects, the techniques described herein relate to a motor vehicle, further including a closure assembly configured to move between closed and open positions to selectively cover and uncover the front trunk, wherein the closure assembly includes a light source.

In some aspects, the techniques described herein relate to a motor vehicle, wherein, when the closure assembly is in the open position and the platform is in the deployed position, the light source is configured to illuminate the panel.

In some aspects, the techniques described herein relate to a motor vehicle, wherein the light source is configured to provide a conspicuity lamp of the motor vehicle.

In some aspects, the techniques described herein relate to a motor vehicle, wherein the motor vehicle is configured to lock a suspension of the motor vehicle when the platform is in the deployed position.

In some aspects, the techniques described herein relate to a method, including: removing a first panel from a platform of a front trunk of a motor vehicle; and mounting a second panel to the platform, wherein the second panel exhibits at least one dimension different than the first panel.

In some aspects, the techniques described herein relate to a method, wherein the at least one dimension is a height.

In some aspects, the techniques described herein relate to a method, further including: sliding the platform to a retracted position in which the second panel provides a floor of the front trunk; and sliding the platform to a deployed position in which the second panel provides a work surface.

In some aspects, the techniques described herein relate to a method, further including sliding a drawer out of the platform.

In some aspects, the techniques described herein relate to a method, further including activating a light mounted to a closure assembly of the front trunk such that the light illuminates the second panel when the closure assembly is in an open position and the platform is in the deployed position.

In some aspects, the techniques described herein relate to a method, further including sliding a plurality of storage compartments together with the platform, wherein the plurality of storage compartments are mounted adjacent a rear of the platform.

DETAILED DESCRIPTION

This disclosure relates to a front trunk including a moveable platform. Among other benefits, which will be appreciated from the below description, the disclosed features increase the usability of the front trunk, and, in turn, the vehicle overall. In particular, many of the features discussed below are intended to make the front trunk more usable at worksites, tailgating events, etc.

Figure 1:
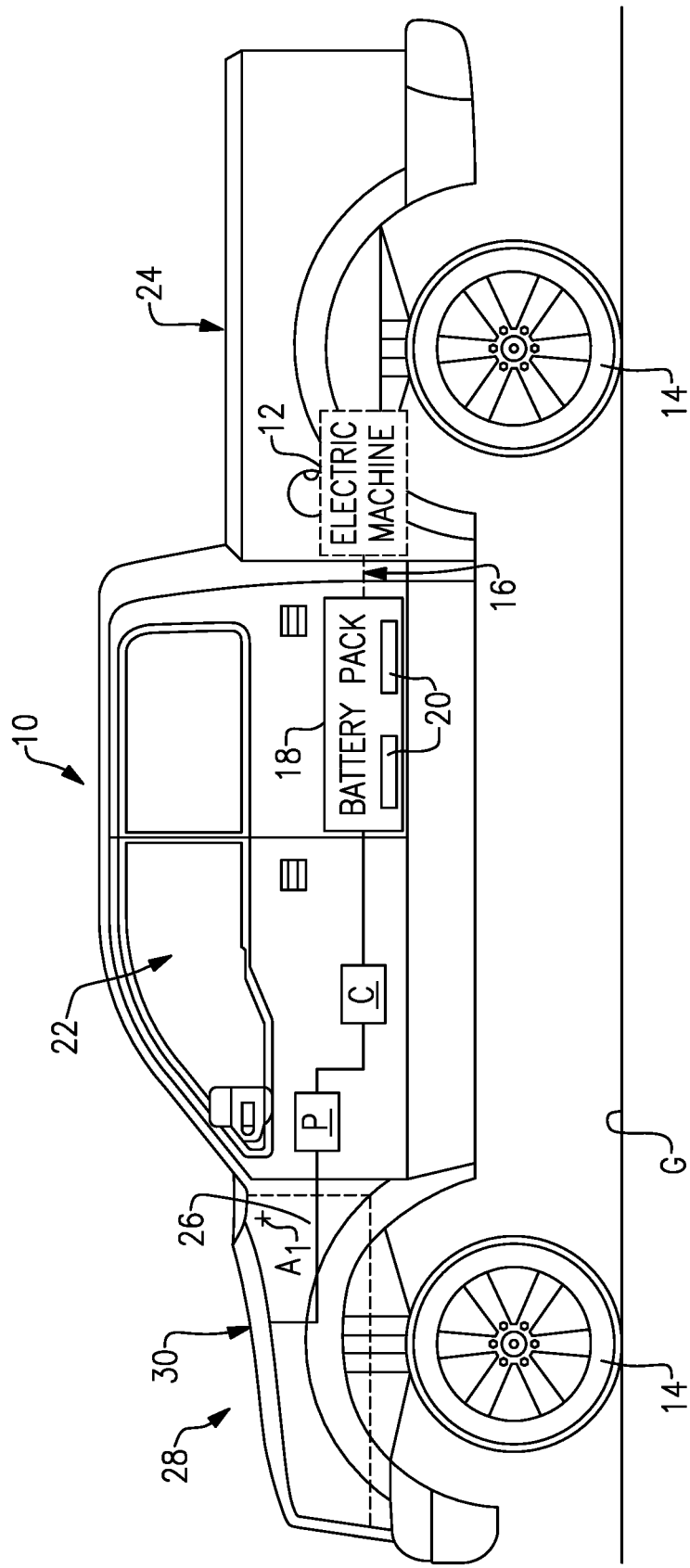
FIG. 1 schematically illustrates an electrified vehicle.

FIG. 1 schematically illustrates a motor vehicle, which here is an electrified vehicle 10 ("vehicle 10"). The vehicle 10 may include any type of electrified powertrain. In an embodiment, the vehicle 10 is a battery electric vehicle (BEV). However, the concepts described herein are not limited to BEVs and could extend to other electrified vehicles, including, but not limited to, plug-in hybrid electric vehicles (PHEVs), fuel cell vehicles, etc. Therefore, although not specifically shown in this embodiment, the vehicle 10 could be equipped with an internal combustion engine that can be employed either alone or in combination with other energy sources to propel the vehicle 10. In particular, certain aspects of this disclosure could apply to vehicles other than electrified vehicles that include front trunks, such as mid-engined or rear-engined vehicles.

In the illustrated embodiment, the vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14, such as through a transmission gearbox (not shown).

A voltage bus 16 electrically connects the electric machine 12 to a battery pack 18. The battery pack 18 is an exemplary electrified vehicle battery. The battery pack 18 may be a high voltage traction battery pack that includes one or more battery arrays 20 (i.e., groupings of rechargeable battery cells) capable of outputting electrical power to operate the electric machine 12 and/or other electrical loads of the vehicle 10. Other types of energy storage devices and/or output devices can also be used to electrically power the vehicle 10.

In the illustrated embodiment, the vehicle 10 is a pickup truck. However, the vehicle 10 could also be a car, a van, a sport utility vehicle, or any other type of vehicle.

As shown in FIG. 1, the vehicle 10 includes a passenger cabin 22, a truck bed 24 located to the rear of the passenger cabin 22, and a front trunk 26 located to the front of the passenger cabin 22. The truck bed 24 may establish a first cargo space of the vehicle 10, and the front trunk 26 may establish a second cargo space of the vehicle 10. The front trunk 26 may be referred to using the portmanteau "frunk" or more generally as a front cargo space.

The front trunk 26 may provide an additional cargo space not traditionally available in most conventional internal combustion powered vehicles. This disclosure includes various features that increase the usefulness and usability of the front trunk 26.

The front trunk 26 is selectively covered by a closure assembly 28. In this example, the closure assembly 28 is provided by a panel 30 that provides the hood and grille of the vehicle 10. The panel 30 is rotatable about axis Ai adjacent a rear of the panel 30 between a closed position (FIG. 1) and an open position (FIG. 2) to selectively cover and uncover the front trunk 26. While a particular closure assembly is shown in FIG. 1, this disclosure extends to other closure assemblies.

Figure 2:
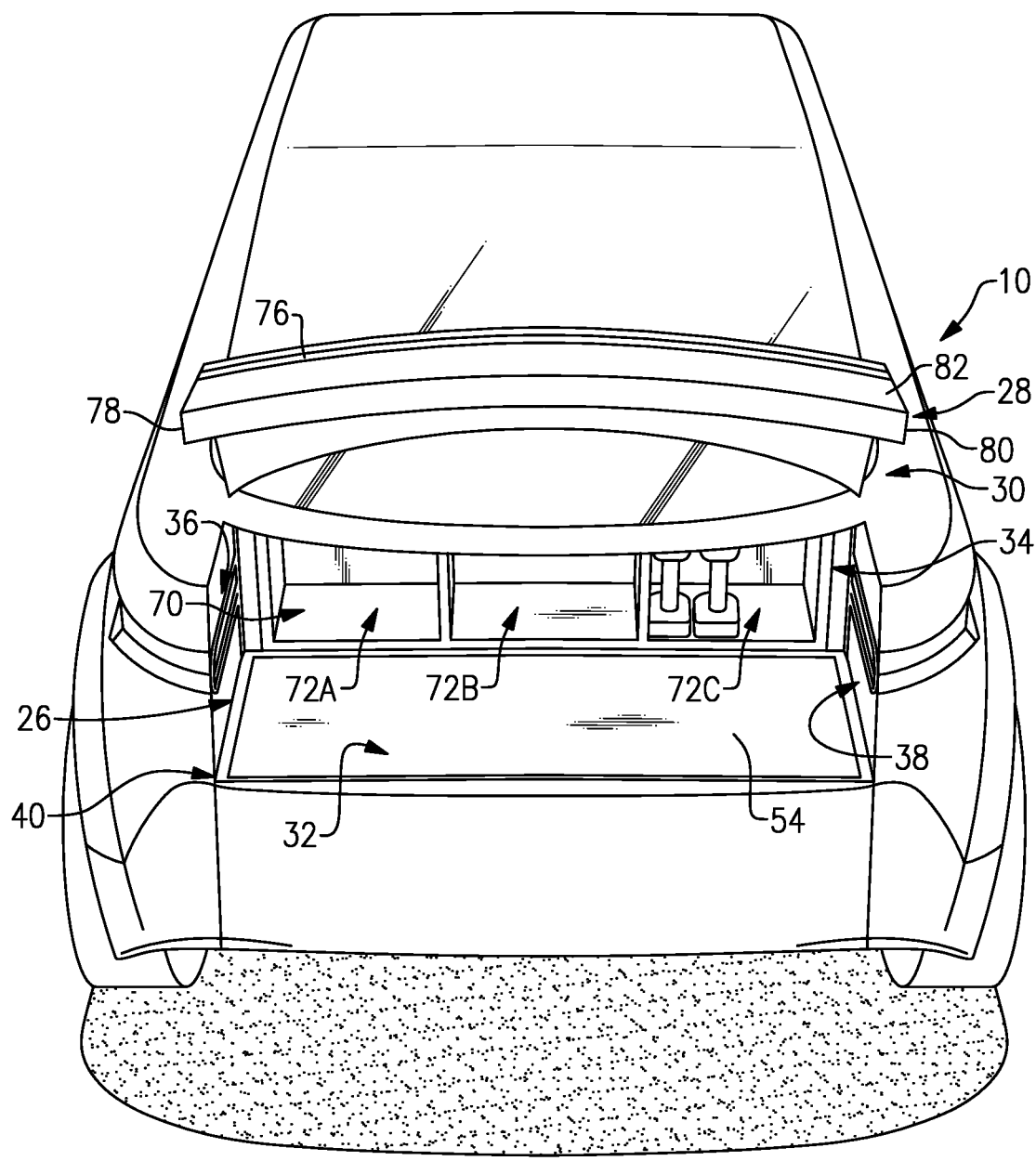
FIG. 2 is a front view of a front trunk of the electrified vehicle with a platform in a retracted position.

FIG. 2 illustrates the interior of the front trunk 26. The front trunk 26 includes a floor 32, a rear wall 34, and opposed lateral side walls 36, 38, which provide boundaries of a front cargo space of the vehicle 10. Various items can rest on the floor 32, and various other items can be attached and/or stored relative to the rear wall 34, in this example.

Figure 3:
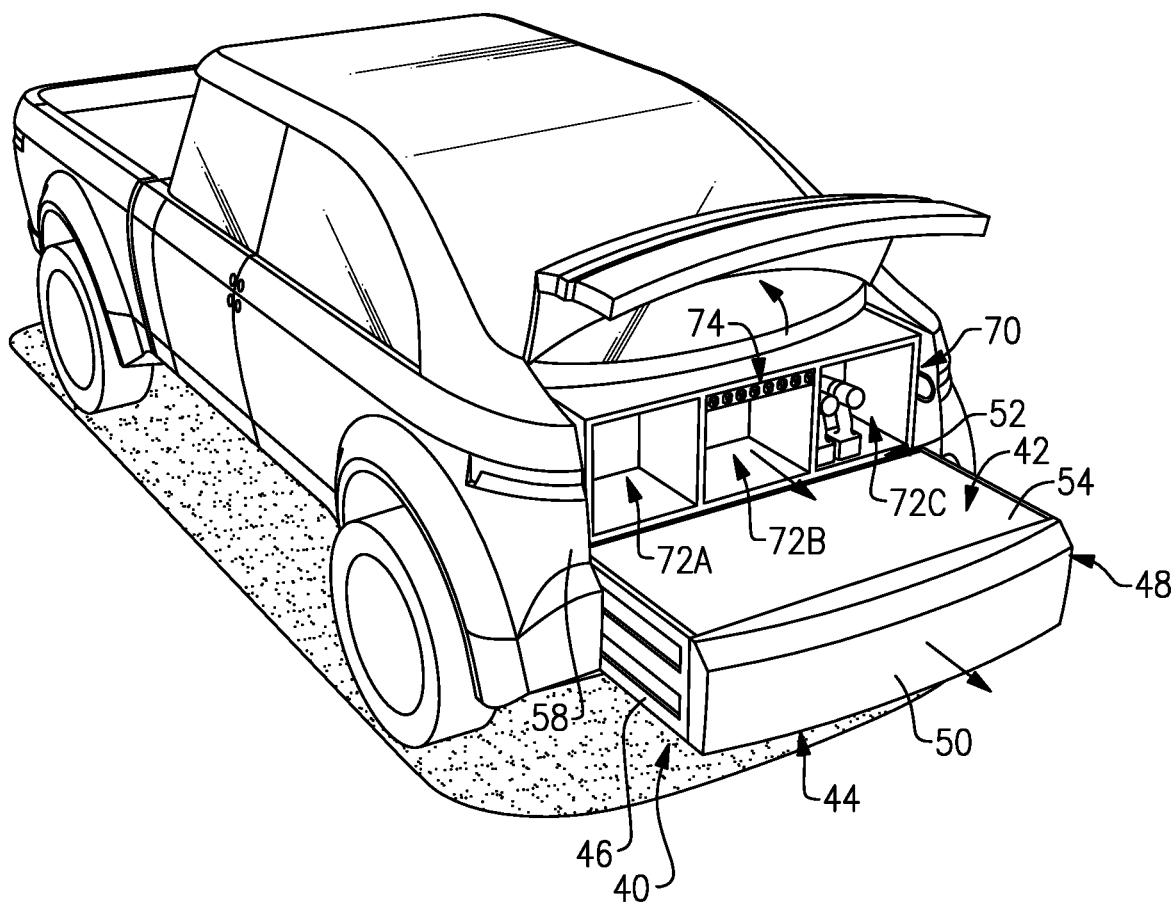
FIG. 3 is a perspective view of the front trunk with the platform in a deployed position.

In this disclosure, the front trunk 26 includes a platform 40 moveable between a retracted position (FIG. 2) and a deployed position (FIG. 3). As shown, the platform 40 is configured to slide relative to a remainder of the body of the vehicle 10 when moving between the retracted and deployed positions. In this example, the platform 40 is slidable in a direction parallel to a centerline of the vehicle 10. The platform 40 may be considered a slidable shelf.

As shown in FIG. 3, the platform 40 includes a top 42, a bottom 44, opposed lateral sides 46, 48, a front 50, and a rear 52. In this example, a panel 54 is mounted relative to the top 42. The panel 54 is received in and supported by a recess 56 (FIG. 4) formed in the top 42. When the platform 40 is in the retracted position, the panel 54 provides the floor 32 of the front trunk 26. When the platform 40 is in the deployed position, the panel 54 provides a work surface. As shown in FIG. 3, when the platform 40 is in the deployed position, a majority of the surface area of the panel 54 is forward of an adjacent portion of the body 58 of the vehicle 10.

As used herein, the term "work surface" refers to a substantially flat surface configured to act as a desk, a picnic table, and/or to facilitate performance of various tasks, including by supporting items thereon. The term work surface also refers to surfaces that can be used for storage of tools or objects being worked on by tools, provide a tabletop for writing, supporting computing devices, and/or facilitating food preparation or food service, etc. The panel 54 could be made of a material suitable for use as a cutting board, for example.

Figure 4:
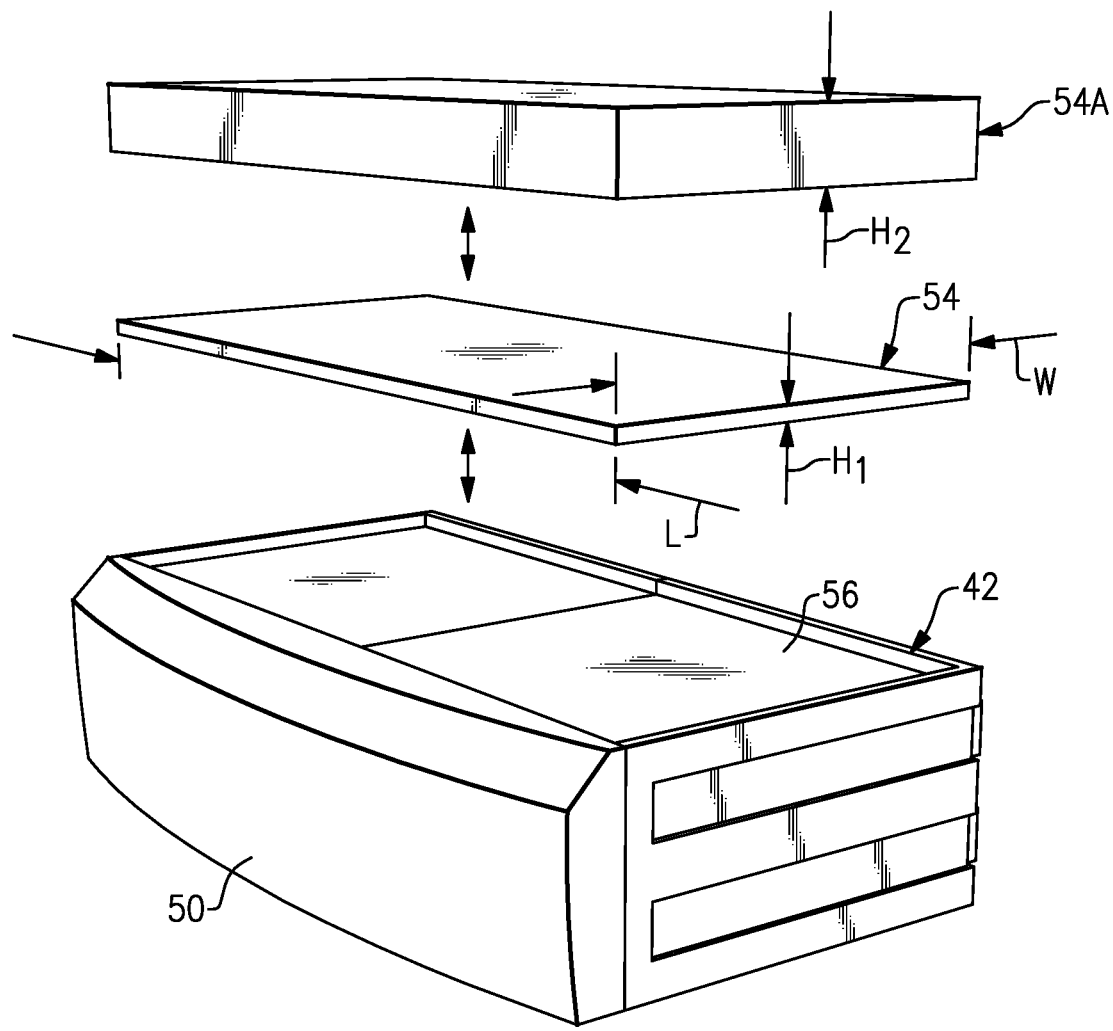
FIG. 4 is an exploded, perspective view of the platform and two exemplary panels.

With reference to FIG. 4, the panel 54 exhibits a length L, width W, and a first height $H_1$, in this example. The length L and width W correspond to the dimensions of the recess 56. The panel 54 is selectively removable from the recess 56 in this example. In this example, the panel 54 may be press-fit into the recess 56 or may be selectively fastened relative to the recess 56. A user may replace the panel 54 with an identical panel or another panel, such as panel 54A, which includes at least one dimension different than panel 54. A user may choose to replace the panel 54 with an identical panel when the panel 54 has worn from use, and the user may choose to replace the panel 54 with a differently-dimensioned panel when the user desires to adjust an effective height of the work surface. In this example, the panel 54A includes the same length and width as the panel 54, and the second panel 54A exhibits a second height $H_2$ greater than height $H_1$. In this way, a user can select one of the panels 54, 54A to vary a height of the work surface relative to the ground surface G (FIG. 1). While the panel 54 is replaceable in some examples, in other examples the panel 54 is integrally formed with the remainder of the platform 40.

With reference to the panel 54, the panel 54 can be formed as a textured or finished surface configured to resist sliding of items places on top of the panel 54. A rubber mat could be attached to or placed on the top of the panel 54. The panel 54 could also include or incorporate a wireless charging pad. The panel 54 could include one or more embossings that establish one or more measurement rulers for measuring items when positioned atop the work surface. The panel 54 could also include one or more power outlets. The panel 54A can be configured similarly.

The platform 40 is slidable between the retracted and deployed positions using one or more guides or tracks mounted between the sides 46, 48 of the platform 40 and the sides 36, 38 of the front trunk 26, respectively.

In an example, the platform 40 is moveable between the retracted and deployed positions by a powered assembly P (FIG. 1) in this example. The powered assembly P can include one or more powered actuators, gears, and/or linkages configured to move the platform 40 between the retracted and deployed positions automatically and without requiring a user to apply force to the platform 40. The closure assembly 28 is also moveable between the closed and open positions by a powered assembly P (FIG. 1) in this example. This disclosure is not limited to automatically moveable closure assemblies and platforms. One or both of the closure assembly 28 and the platform 40 could be manually moveable as an alternative to, or in addition to, being automatically moveable.

Further, the vehicle 10 includes a controller C (FIG. 1) that can be part of an overall vehicle control module, such as a vehicle system controller (VSC), or could alternatively be a stand-alone controller separate from the VSC. The controller C may be programmed with executable instructions for interfacing with and operating the various components of the vehicle 10. The controller additionally includes a processing unit and non-transitory memory for executing the various control strategies and modes of the vehicle 10. The controller C can issue commands to the powered assembly P to initiate movements of the closure assembly 28 and the platform 40, as examples.

In an example, when the closure assembly 28 is closed (FIG. 1) and the platform 40 is in the retracted position, in response to a command from the user, for example, the controller C is configured to command the powered assembly P to move the closure assembly 28 to the open position while simultaneously issuing a command causing the platform 40 to slide the deployed position. In this way, as the closure assembly 28 opens, the platform 40 gradually slides to the deployed position. The controller C is also configured to issue commands causing the closure assembly 28 to move the closed position simultaneous with movement of the platform 40 to the retracted position. While simultaneous movements are described, the controller C could initiate other movements, such as stepped or staggered movements, in which the closure assembly 28 and platform 40 move during different time periods.

In one specific aspect of this disclosure, the controller C is configured to command the suspension of the vehicle 10 to lock when the platform 40 is in the deployed position. In this way, when the platform 40 is being used as a work surface, movements of the platform 40 are minimized.

Figure 5:
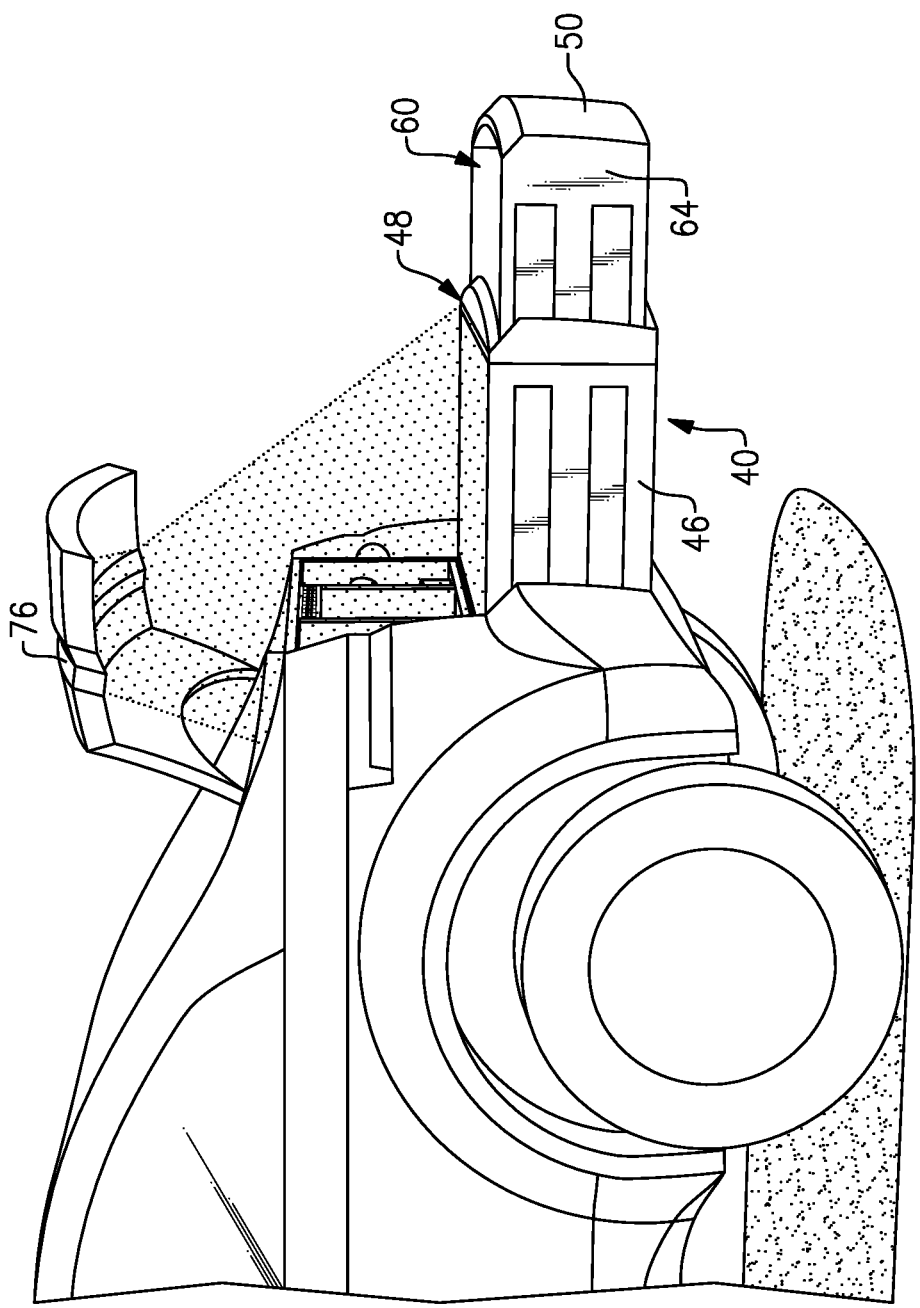
FIG. 5 is a side view of the front trunk with the platform in the deployed position and a drawer of the platform opened. Further, a light source mounted to a closure assembly is emitting light onto the platform.
Figure 6:
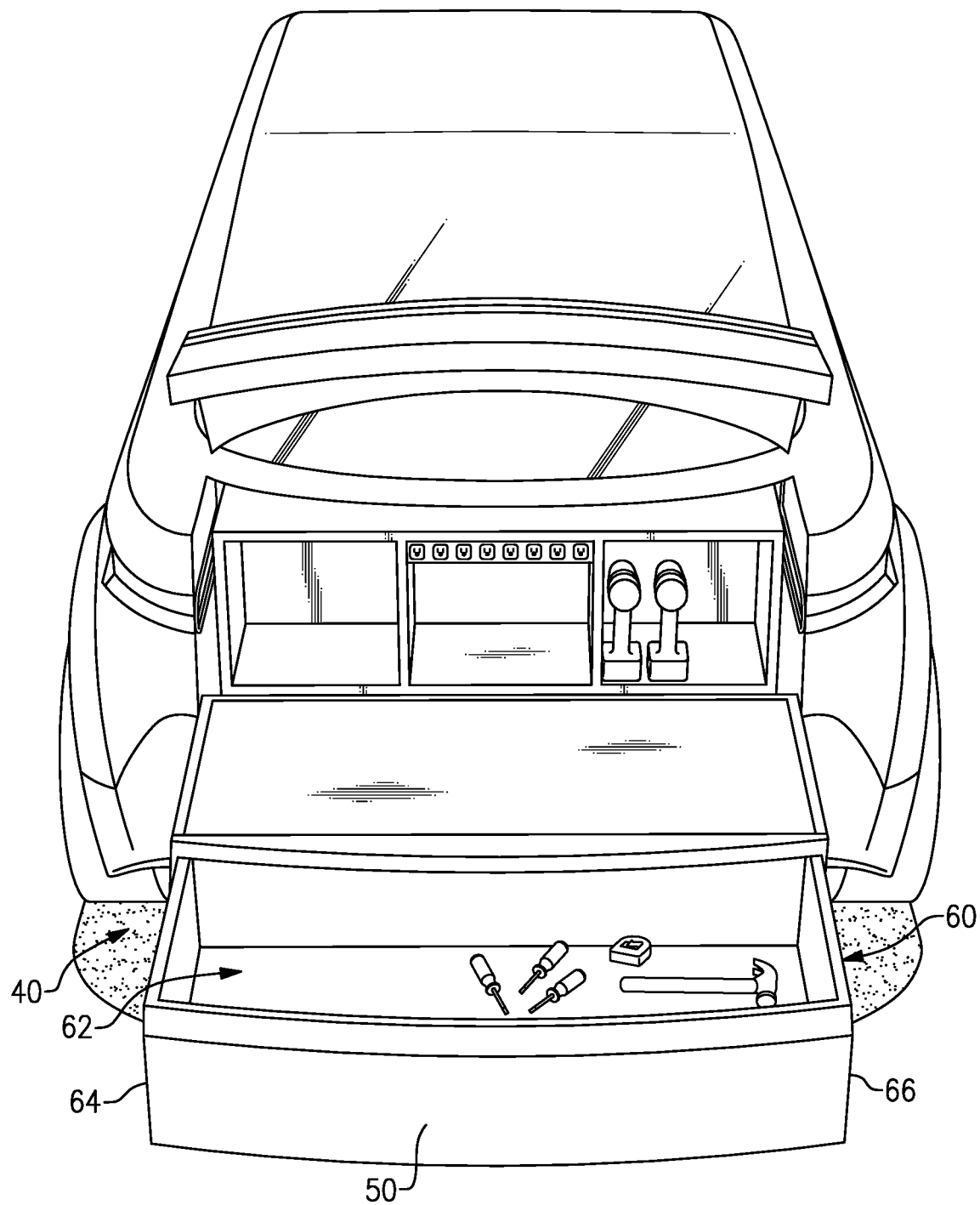
FIG. 6 is a front view of the front trunk with the platform in the deployed position and the drawer opened.

In an aspect of this disclosure, the platform 40 includes a drawer 60 (FIG. 5). In this disclosure, the front 50 of the platform 40 provides a front of the drawer 60. The drawer 60 is configured to slide forward and backward relative to the platform 40 to open and close to selectively expose a storage compartment 62 (FIG. 6) in a top of the drawer 60. Sides 64, 66 of the drawer 60 are configured to slide relative to inner surfaces of sides 46, 48 using tracks or guides, as examples. The storage compartment 62 is able to store various items such as tools.

In this example, the front 50 provides at least a portion of a front bumper of the vehicle 10. In this regard, the front 50 may be a class A surface. The front 50 may include a handle configured to be grasped by a user such that the user can slide the drawer 60 relative to the platform 40. Alternatively, the drawer 60 could be mounted to the platform 40 using push to open drawer slides such that a user pushes inward on the drawer 60 to open the drawer 60. Further, as another alternative, the drawer 60 could be configured to open and close automatically by the powered assembly P.

In another aspect of this disclosure, the platform 40 includes a plurality of storage compartments 70 mounted adjacent the rear 52 of the platform 40, as shown in FIGS. 2 and 3. In this example, there are three storage compartments 72A-72C configured as forward-facing cubby bins that are spaced-apart laterally from one another in a direction perpendicular to a centerline of the vehicle 10. The storage compartments 72A-72C are configured to store various items, such as tools, in the front trunk 26. The storage compartments 72A-72C provide the rear wall 34 of the front trunk 26 when the platform 40 is in the retracted position. In this example, the storage compartments 72A-72C are fixed relative to the platform 40 such that the storage compartments 72A-72C are configured to slide together with the platform 40 as the platform 40 slides between the retracted and deployed positions. In this way, when the platform 40 is in the deployed position, a user can readily access items stored in the storage compartments 72A-72C. In other examples the storage compartments 72A-72C are not moveable or a moveable independent of the platform 40.

One or more of the storage compartments 72A-72C may include at least one power outlet. As shown in FIG. 3, the middle storage compartment 72B includes eight 120 Volt power outlets 74 mounted adjacent a top of the storage compartment 72B. While a particular number and type of power outlets are shown, the front trunk 26 could include another number or type of power outlets, such as 240 Volt power outlets, USB-C outlets, etc., in various locations.

In another aspect of this disclosure, the platform 40 is selectively illuminated by a light source incorporated into the closure assembly 28. With reference to FIG. 2, the closure assembly 28 includes a conspicuity lamp in the form of a light bar 76 extending laterally between sides 78, 80 of a grille section 82 of the panel 30. The grille section 82 may be sized and shaped to match a grille in an engine-driven model of a vehicle, such as a pickup truck, in order to maintain the same look and allow for essentially the same front end vehicle body structure across a vehicle lineup.

The light bar 76, in this example, extends an entire distance between sides 78, 80 and provides at least a portion of a forward-facing conspicuity lamp of the vehicle 10. In particular, the light bar 76 provides at least a portion of a headlamp or headlamp assembly of the vehicle 10. When the closure assembly 28 is closed and the vehicle 10 is driving, the light bar 76 is configured to emit light in a forward direction. The light bar 76, in this example, is also configured to selectively emit light in an opposite direction, as generally shown in FIG. 5, to illuminate the platform 40, which facilitates use of the platform 40 in low light conditions. The closure assembly 28 may include a lens configured to selectively open when the platform 40 is in the deployed position such that the light bar 76 may direct light to the platform 40. Alternatively, the light bar 76 can rotate about its length when the platform 40 is in the deployed position to direct light toward the platform 40. Further, another light source other than the light bar 76 may be mounted to the closure assembly 28 and configured to selectively direct light onto the platform 40. The light bar 76, or another light source, and any corresponding lens (if present) is configured to become activated to emit light that illuminates the platform 40 in response to commands from the controller C.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used with reference to the normal operational orientation of the vehicle and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a front trunk including a platform configured to move between a retracted position and a deployed position, wherein, when the platform is in the retracted position, a panel on a top of the platform provides a floor of the front trunk, wherein, when the platform is in the deployed position, the panel provides a work surface,
wherein the platform is configured to slide in a direction parallel to a centerline of the motor vehicle when moving between the retracted and deployed positions,
wherein the panel is supported by a recess in a top of the platform,
wherein a front surface of the platform provides at least a portion of a front bumper of the motor vehicle, and
wherein the platform includes a drawer configured to slide relative to the platform.

2. The motor vehicle as recited in claim 1, wherein the panel is selectively removable from the recess, and wherein another panel exhibiting at least one dimension different than the panel is configured to fit in the recess.

3. The motor vehicle as recited in claim 1, wherein the front surface of the platform provides a front surface of the drawer.

4. A motor vehicle, comprising:
a front trunk including a platform configured to move between a retracted position and a deployed position, wherein, when the platform is in the retracted position, a panel on a top of the platform provides a floor of the front trunk, wherein, when the platform is in the deployed position, the panel provides a work surface,
wherein the platform is configured to slide in a direction parallel to a centerline of the motor vehicle when moving between the retracted and deployed positions,
wherein the panel is supported by a recess in a top of the platform,
wherein the panel is selectively removable from the recess, and wherein another panel exhibiting at least one dimension different than the panel is configured to fit in the recess, and
further comprising a plurality of storage compartments arranged adjacent a rear of the platform.

5. The motor vehicle as recited in claim 4, wherein the plurality of storage compartments are configured to slide together with the platform.

6. The motor vehicle as recited in claim 1, further comprising a powered assembly configured selectively cause the platform to move between the retracted and deployed positions.

7. The motor vehicle as recited in claim 1, further comprising a closure assembly configured to move between closed and open positions to selectively cover and uncover the front trunk, wherein the closure assembly includes a light source.

8. The motor vehicle as recited in claim 7, wherein, when the closure assembly is in the open position and the platform is in the deployed position, the light source is configured to illuminate the panel.

9. The motor vehicle as recited in claim 8, wherein the light source is configured to provide a conspicuity lamp of the motor vehicle.

10. A motor vehicle, comprising:
a front trunk including a platform configured to move between a retracted position and a deployed position, wherein, when the platform is in the retracted position, a panel on a top of the platform provides a floor of the front trunk, wherein, when the platform is in the deployed position, the panel provides a work surface, and
wherein the motor vehicle is configured to lock a suspension of the motor vehicle when the platform is in the deployed position.

* * * * *